(12) United States Patent
Martin et al.

(10) Patent No.: US 7,124,837 B2
(45) Date of Patent: Oct. 24, 2006

(54) PNEUMATIC MOTOR TRIGGER ACTUATOR

(75) Inventors: Scott A Martin, Swansea, IL (US); Thomas O Blankenship, St. Charles, MO (US); James L Morrison, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 58 days.

(21) Appl. No.: 10/787,265

(22) Filed: Feb. 26, 2004

(65) Prior Publication Data

US 2005/0189127 A1    Sep. 1, 2005

(51) Int. Cl.
*B25D 1/00* (2006.01)

(52) U.S. Cl. .......................................... 173/1; 173/169

(58) Field of Classification Search ................ 173/221, 173/9, 2, 15, 13, 18, 169, 218, 1; 408/14, 408/17, 130
See application file for complete search history.

(56) References Cited

U.S. PATENT DOCUMENTS

| | | | | |
|---|---|---|---|---|
| 2,854,871 A | * | 10/1958 | Stratman | 173/157 |
| 3,043,272 A | * | 7/1962 | Wandel et al. | 91/420 |
| 3,088,440 A | * | 5/1963 | Wilmer | 91/5 |
| 3,094,901 A | * | 6/1963 | Wandel et al. | 91/454 |
| 3,487,729 A | * | 1/1970 | Juhasz et al. | 408/14 |
| 4,329,092 A | * | 5/1982 | Ponitzsch et al. | 408/11 |
| 4,448,338 A | * | 5/1984 | Graf et al. | 227/8 |
| 4,453,868 A | * | 6/1984 | Winslow | 408/138 |
| 4,961,675 A | * | 10/1990 | Stewart | 408/1 R |
| 5,071,293 A | * | 12/1991 | Wells | 408/112 |
| 5,295,770 A | * | 3/1994 | Pennison et al. | 408/6 |
| 5,974,611 A | * | 11/1999 | Casella | 15/3.52 |
| 6,776,562 B1 | * | 8/2004 | Morrison et al. | 408/56 |

* cited by examiner

*Primary Examiner*—Stephen F. Gerrity
*Assistant Examiner*—Paul Durand
(74) *Attorney, Agent, or Firm*—Harness Dickey & Pierce P.L.C.

(57) ABSTRACT

A pneumatic motor trigger actuator includes a trigger housing adapted to engage a pneumatic motor trigger of a pneumatic tool. A top plate is coupled to the trigger housing. A primary valve is coupled to the top plate and has an open configuration and a closed configuration. The primary valve is pneumatically coupled to the trigger housing such that air flow through the primary valve, when the primary valve is in the open configuration, enters the trigger housing and causes a plug to physically engage the motor trigger with sufficient force to move it to is fully engaged position. The primary valve includes a primary switch and an automatic stop switch. The primary switch is engagable by an operator to configure the primary valve in the open configuration. The automatic switch is engagable by an object to move the primary valve to the closed configuration when a predetermined condition is met.

4 Claims, 6 Drawing Sheets

PNEUMATIC MOTOR TRIGGER ACTUATOR

FIELD OF THE INVENTION

The present invention relates to pneumatic tools, and more particularly to a pneumatic motor trigger actuator for a pneumatic tool.

BACKGROUND OF THE INVENTION

Pneumatic tools are common throughout industry and are used in a wide variety of manufacturing settings. For example, pneumatic tools are prelevant in the aircraft manufacturing industry. One typical pneumatic tool used in the aircraft manufacturing industry is a hand held drilling unit. When drilling through an aircraft structure using a hand held drilling unit, an operator must maintain positive finger pressure against the start trigger of the drilling unit throughout the entire drilling cycle. While not necessarily significant under some conditions, when drilling through materials often used in the aerospace industry, it may take as long as six minutes to complete a single drilling cycle in this manner. Upon releasing the trigger, the trigger returns to its rest position and the pneumatic motor stops. The constant pressure maintained by the operator throughout a long drilling cycle may potentially cause hand and wrist fatigue.

Prior solutions to hand and wrist fatigue have involved either rotating attachments or engagement buttons that require cumbersome movement of the operator's hand. While these solutions may reduce the length of time required to maintain pressure on the trigger, the operator is still required to initially depress the trigger and then perform additional operations. Accordingly, significant hand and wrist fatigue still occur during repetitive and cyclical use of a hand held drilling unit. Moreover, with these prior solutions, the operator is required to disengage the rotating attachment or engagement buttons at the end of each use.

SUMMARY OF THE INVENTION

A pneumatic motor trigger actuator includes a trigger housing adapted to engage a pneumatic motor trigger. A top plate is coupled to the trigger housing. A primary valve is coupled to the top plate and has an open configuration and a closed configuration. The primary valve is pneumatically coupled to the trigger housing such that air flow through the primary valve when the primary valve is in the open configuration enters the trigger housing and engages the pneumatic motor trigger. The primary valve includes a primary switch and an automatic stop switch. The primary switch is engagable by an operator to configure the primary valve in the open configuration. The automatic switch is engagable by an object to configure the primary valve to the closed configuration when certain conditions are met. When the primary valve is in the closed configuration, air does not pass therethrough to the trigger housing and the pneumatic motor trigger is not engaged.

By eliminating the need for an operator to continuously hold down the pneumatic motor trigger throughout a drilling operation, operator fatigue is greatly reduced. Additionally, automatic shutoff and emergency shutoff of the drilling cycle greatly increased safety and efficiency.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
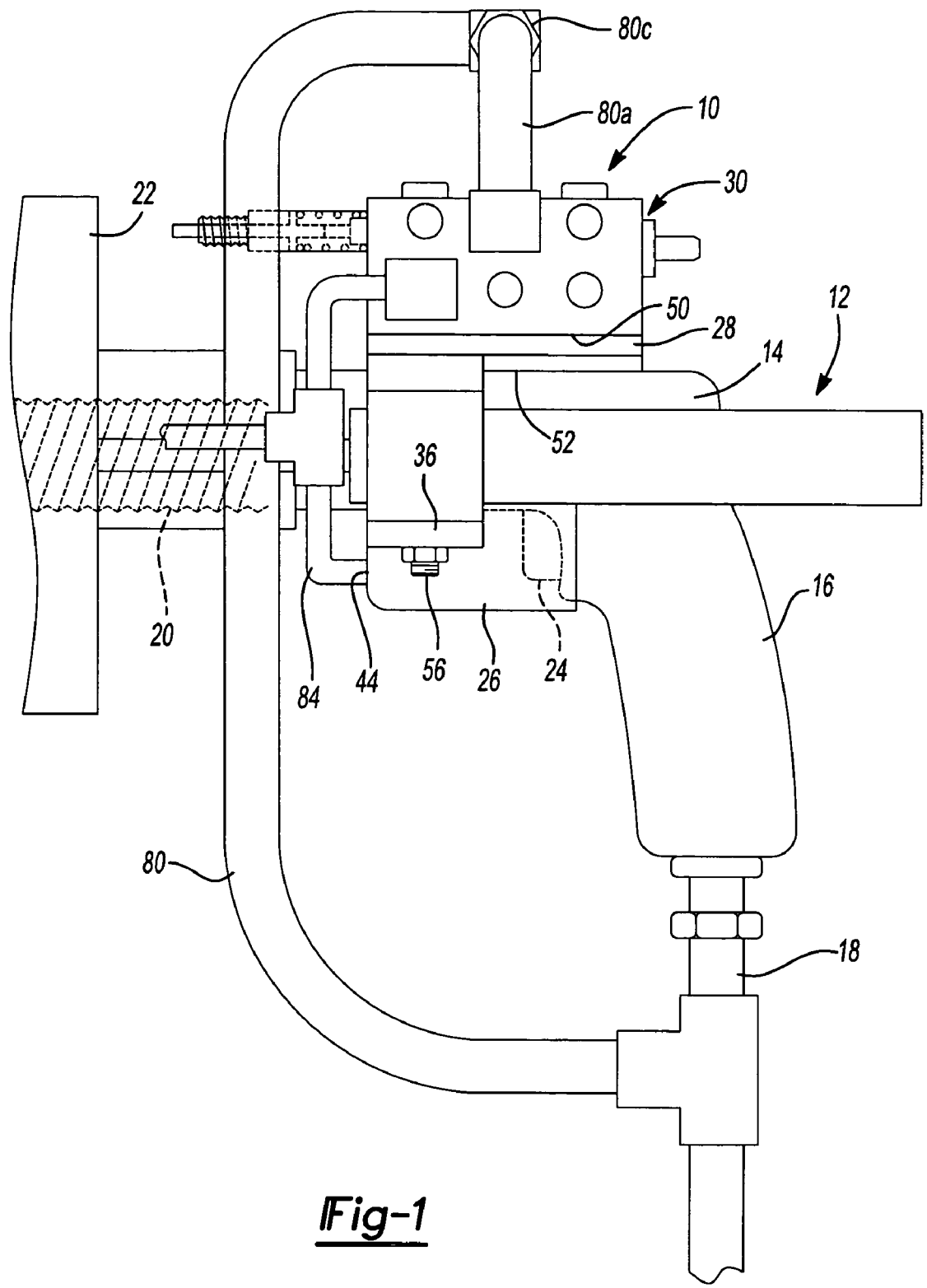
FIG. 1 is a side view of a pneumatic motor trigger actuator constructed according to the principles of the present invention shown in operative association with an exemplary pneumatic drill.

With reference to FIG. 1, a preferred embodiment of a pneumatic motor trigger actuator (hereinafter "trigger actuator") 10 constructed according to the principles of the present invention is shown in operative association with an exemplary pneumatic drill 12. The pneumatic drill 12 generally includes a motor housing 14 with a handle 16 extending therefrom. The motor housing 14 contains a pneumatic motor (not shown) located therein. An air input tube 18 is coupled to the pneumatic drill 12 at the handle 16. The air input tube 18 provides compressed air flow to the pneumatic motor (not shown) of the pneumatic drill 12 from a compressed air source (not shown).

The pneumatic drill 12 further includes a drill bit 20 extending out from the motor housing 14. The drill bit 20 is rotationally driven by the pneumatic motor (not shown) using the compressed air flow. A drill cap 22 is slidably coupled to the motor housing 14 and extends around the drill bit 20. The drill cap 22 prevents debris from being ejected from the drill bit 20 as it is driven into a surface.

A trigger 24 is mounted within the handle 16 beneath the motor housing 14. When the trigger 24 is depressed by an operator of the pneumatic drill 12, the pneumatic motor (not shown) is activated which in turn rotates the drill bit 20. As the drill bit 20 is drilled into a work surface (not shown), the drill cap 22 slides relative to the drill bit 20 and the motor housing 14 towards the motor housing 14. The drill cap 22 thereby completely encompasses the drill 22 as it is drilled into a work piece and protects the operator or bystanders from flying debris throughout the drilling cycle. While in the particular example provided, a pneumatic drill 12 has been described, it should be appreciated that any pneumatic tool may be employed with the trigger actuator 10.

Figure 4A:
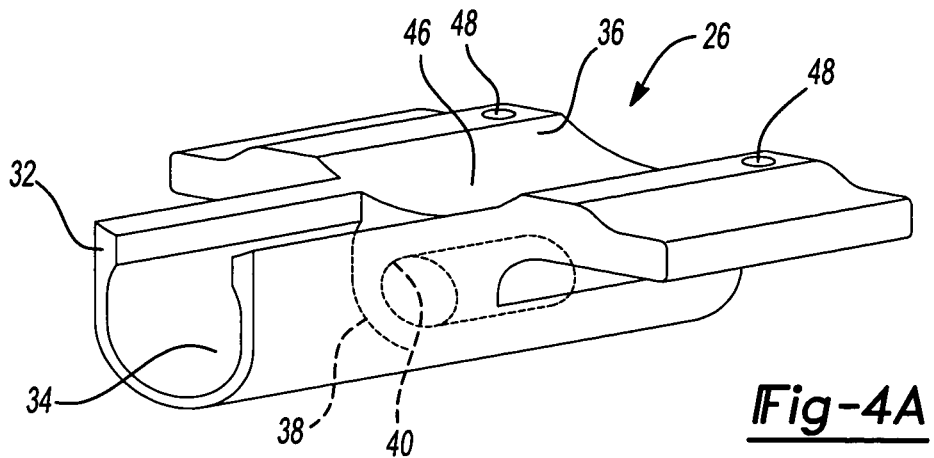
FIG. 4A is a perspective view of a trigger housing used in the pneumatic motor trigger actuator of the present invention.

With continued reference to FIG. 1, the trigger actuator 10 generally includes a trigger housing 26, a top plate 28, and a valve assembly 30. Turning briefly to FIG. 4A, the trigger housing 26 includes a body 32 having a trigger retention portion 34 and a flange portion 36. The trigger retention portion 34 is preferably opened at an end thereof and defines a cavity 38. The cavity 38 is sized to receive at least a portion of the trigger 24 (FIG. 1) of the pneumatic drill 12 therein. An aperture 40 extends from the cavity 38 into the flange portion 36. The aperture 40 is sized to receive a cylindrical piston 42 (FIG. 4C) therein. As will be described in greater detail below, compressed air is channeled into the aperture 40 from an opening 44, as best seen in FIG. 1, formed on the outside of the body 32. The flange portion 36 includes an upper surface 46 having a contour matching that of the motor housing 14 (FIG. 1) of the pneumatic drill 12. Additionally, a pair of bolt holes 48 (FIG. 4A) extend through the flange portion 36 and are used in coupling the trigger housing 26 to the top plate 28, as will also be described below.

Figure 4B:
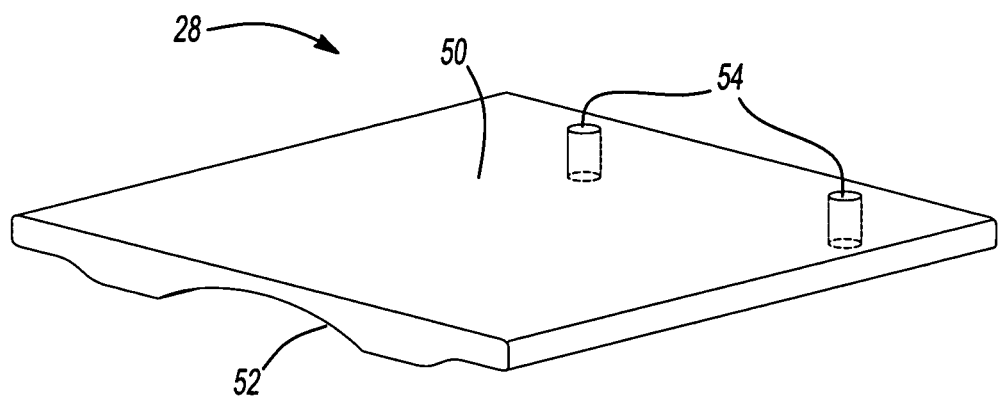
FIG. 4B is a perspective view of a top plate used in the pneumatic motor trigger actuator of the present invention.
Figures 4C, 4D:
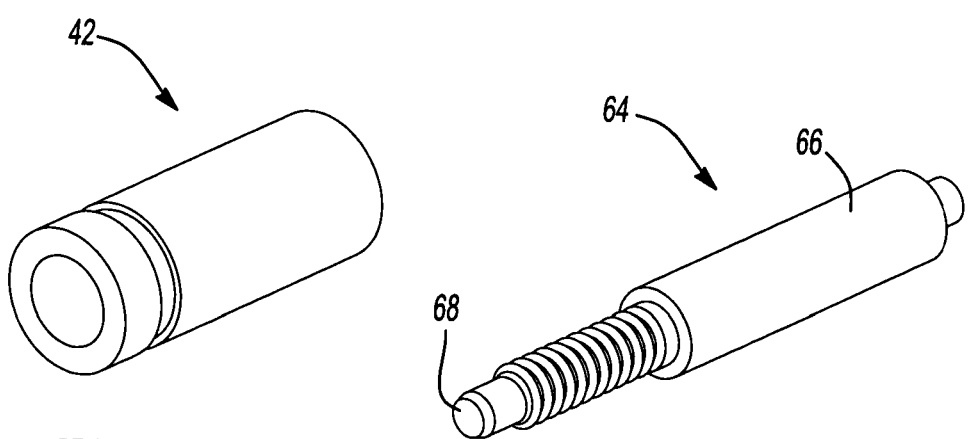
FIG. 4C is a perspective view of a trigger plug used with the pneumatic motor trigger actuator of the present invention.
FIG. 4D is a perspective view of a preset spring stop used with the pneumatic motor trigger actuator of the present invention.

With reference to FIG. 4B, the top plate 28 includes a top surface 50 and a bottom surface 52. The top surface 50 is substantially flat and is adapted to receive the valve assembly 30 (FIG. 1) thereon as will be described below. The bottom surface 52 is contoured to match the shape of the motor housing 14 (FIG. 1) of the pneumatic drill 12. The top plate 28 further includes a pair of bolt holes 54 extending from the top surface 50 to the bottom surface 52.

Turning back to FIG. 1, the trigger housing 26 is coupled to the pneumatic drill 12 such that the trigger 24 extends within the cavity 38 (FIG. 4A) of the trigger housing. The motor housing 14 sits within the contour top surface 46 (FIG. 4A) of the trigger housing 26. The flange portion 36 extends to either side of the motor housing 14. The top plate 28 sits atop the motor housing 14 such that the contour bottom surface 52 of the top plate 28 rests atop the motor housing 14. The top plate 28 and the trigger housing 26 are then coupled together using bolts 56 that extend through the bolt holes 54 (FIG. 4B) of the top plate 28 and through the bolt holes 48 (FIG. 4A) of the trigger housing 26. The valve assembly 30 is then coupled to the top surface 50 of the top plate 28.

Figure 2:
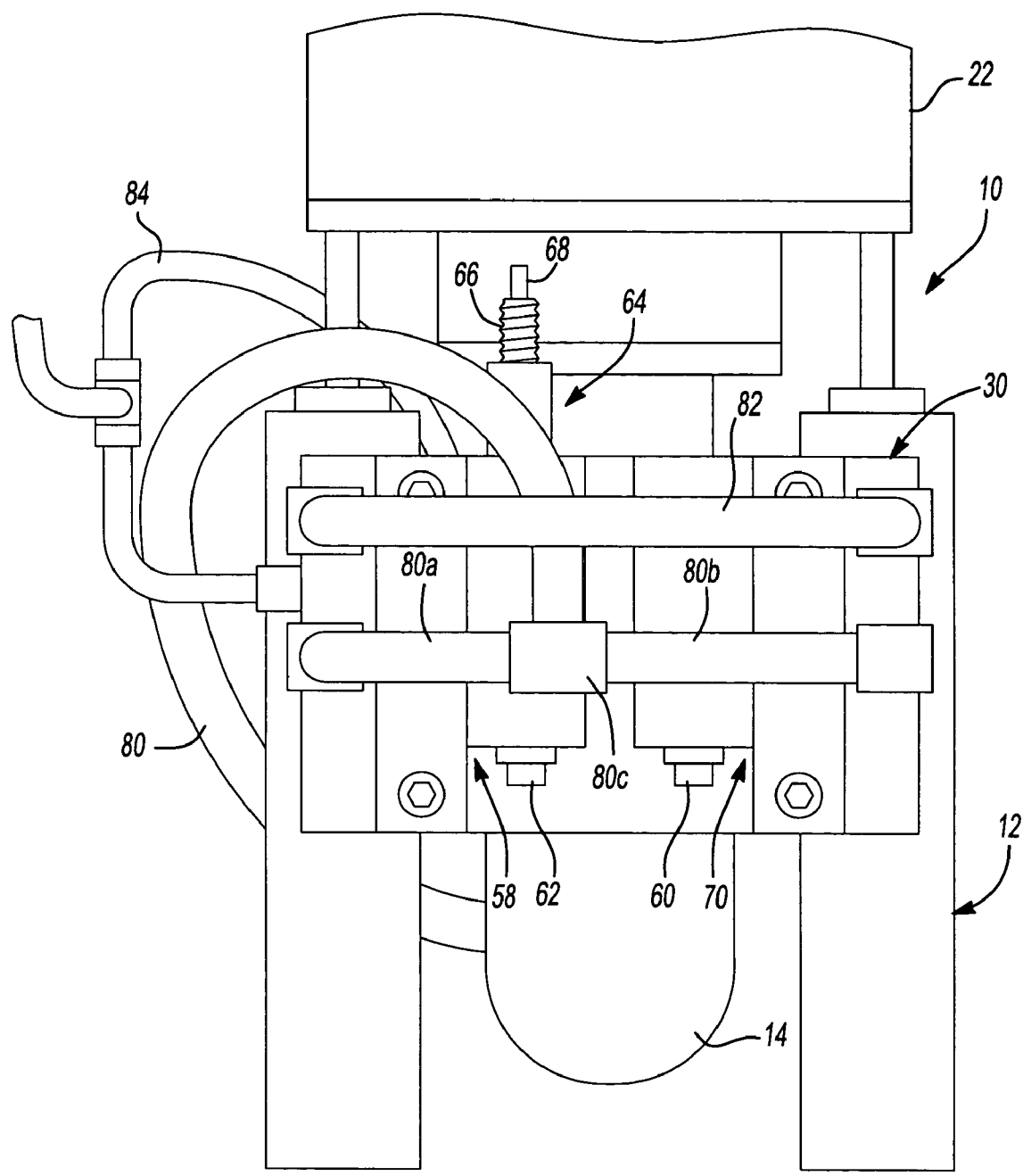
FIG. 2 is a top view of the pneumatic motor trigger actuator and exemplary pneumatic drill of FIG. 1.

Turning now to FIG. 2, the valve assembly 30 preferably includes a primary air valve 58 and an emergency stop air valve 60. The primary air valve 58 is preferably a one way valve that when in an opened position allows compressed air to travel therethrough and when in a closed position prevents compressed air from traveling therethrough. The primary air valve 58 is normally in a closed position until actuated. The primary air valve 58 includes a start up button 62 extending therefrom. Engaging the start up button 62 urges the primary air valve into an opened position. An adjustable feed depth controller 64 extends from an opposite side of the primary air valve 58 such that the adjustable feed depth controller 64 extends toward the drill cap 22. With brief reference to FIG. 3D, the adjustable feed depth controller 64 includes a body 66 having a spring stop 68 extending from an end thereof. The spring stop 68 is biased such that it extends out from the body 66. However, the spring stop 68 may move relative to the body 66 against the biasing force.

The emergency stop air valve 60 likewise is a one way air valve having an opened position and a closed position similar to that of the primary air valve 58. The emergency stop air valve 60 is normally in an open position until actuated. The emergency stop air valve 60 includes an emergency stop button 70 extending therefrom. Engagement of the emergency stop button 70 urges the emergency stop air valve 60 to its closed position.

Figure 3:
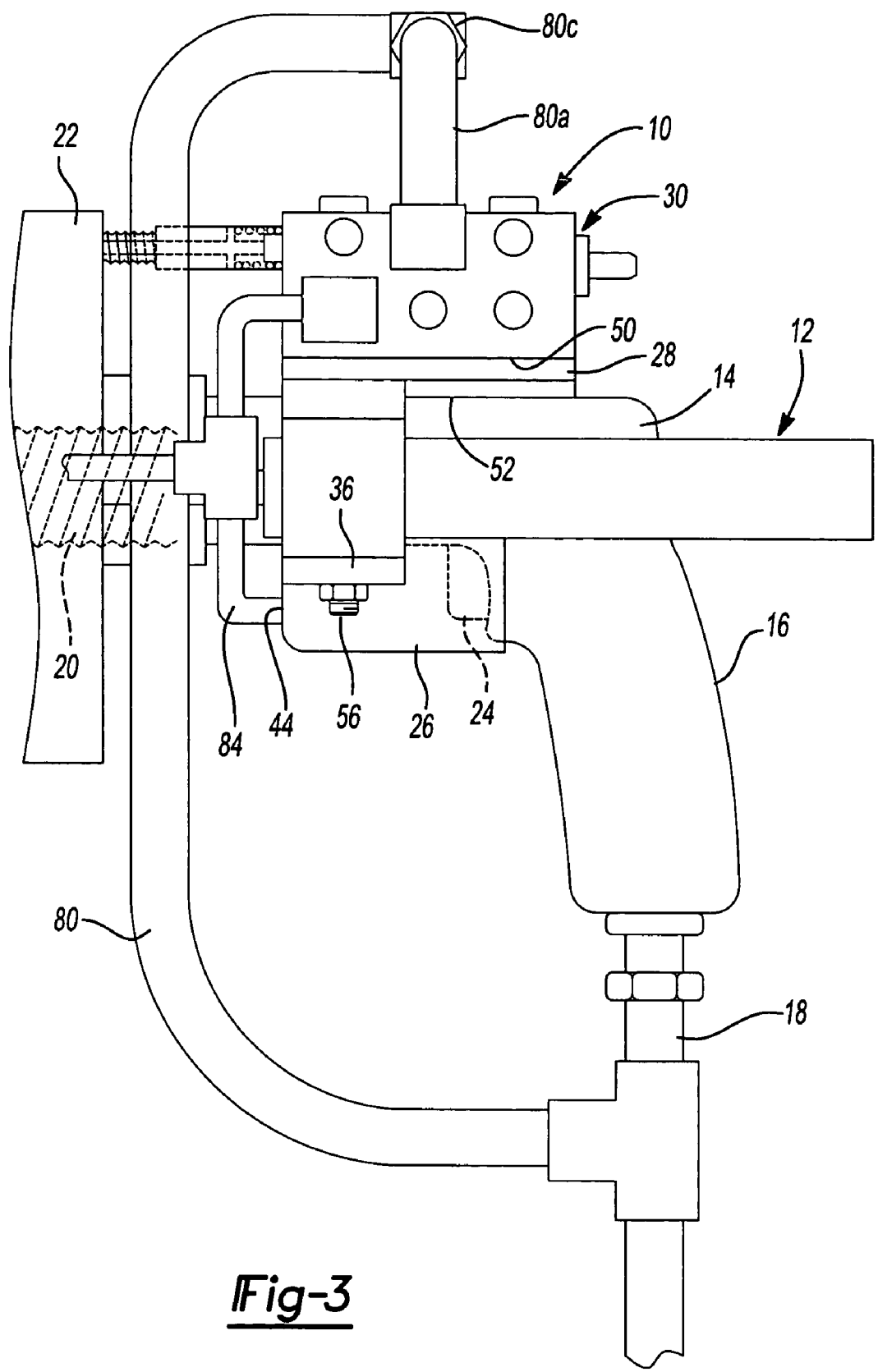
FIG. 3 is a side view of the pneumatic motor trigger actuator and exemplary pneumatic drill shown in an automatic shutoff condition.

Turning to FIG. 3, the automatic shutoff of the pneumatic drill 12 after the end of a drilling cycle will be described. As the pneumatic drill 12 drills into a work piece, the drill cap 22 moves relative to the motor housing 14 until it engages the spring stop 68, as shown. The adjustable feed depth controller 64 is coupled to the primary air valve 58 such that when the spring stop 68 is urged towards the primary air valve 58 by the drill cap 22, the spring stop 68 urges the primary air valve 58 to its closed position. By adjusting the length to which the body 66 of the adjustable feed depth controller 64 extends from the primary air valve 58 the depth to which the pneumatic drill 12 may drill may be automatically set. In other words, the distance between the spring stop 68 and the drill cap 22 defines the depth to which the pneumatic drill 12 may drill. This is because as the drill cap 22 engages the spring stop 68, the spring stop 68 will urge the primary air valve 58 to its closed position, thereby disengaging the pneumatic motor (not shown) as will be described below. In the particular example provided, the body 66 is extendable by unscrewing a first portion 67 relative to a second portion 69 to adjust the length that the spring stop 68 extends from the body 66. It should be appreciated, however, that various other devices or means may be employed for automatically adjusting the drill depth or drill cycle such as, for example, a timed cycle.

With reference to FIGS. 1 and 2, the air flow of the trigger actuator 10 will now be described. First, a portion of compressed air being supplied through air input tube 18 is used to pressurize a first conduit 80. The first conduit 80 is then coupled to both the primary air valve 58 and the emergency air valve 60 via sections 80a and 80b and T-section 80c. A second conduit 82 provides a flow path for the compressed air from the emergency stop air valve 60 to the primary air valve 58. This links the primary air valve 58 and the emergency stop air valve 60 in series. A third conduit 84 then directs the compressed air to the aperture 40 (FIG. 4A) of the trigger housing 26.

When a user engages the start up button 62 to open the primary air valve 58, this allows compressed air to flow from the first conduit 80 and section 80a into primary air valve 58, and through the emergency stop air valve 60, through the second conduit 82, through the third conduit 84, and on into the trigger housing 26. In an alternate preferred embodiment, the emergency stop air valve 60 is in a normally "closed" configuration. Compressed air flows from the first conduit 80 and through sections 80a and 80b into both the primary air valve 58 and the emergency stop air valve 60. Engagement of the emergency stop air valve 60 to its "open" position allows compressed air to flow through the second conduit 82 into the primary air valve 58 such that this compressed air flow urges the primary valve 58 back into its "closed" configuration, thereby shutting off air flow to the trigger housing 26 and accordingly shutting off the pneumatic drill 12.

Figure 5A:
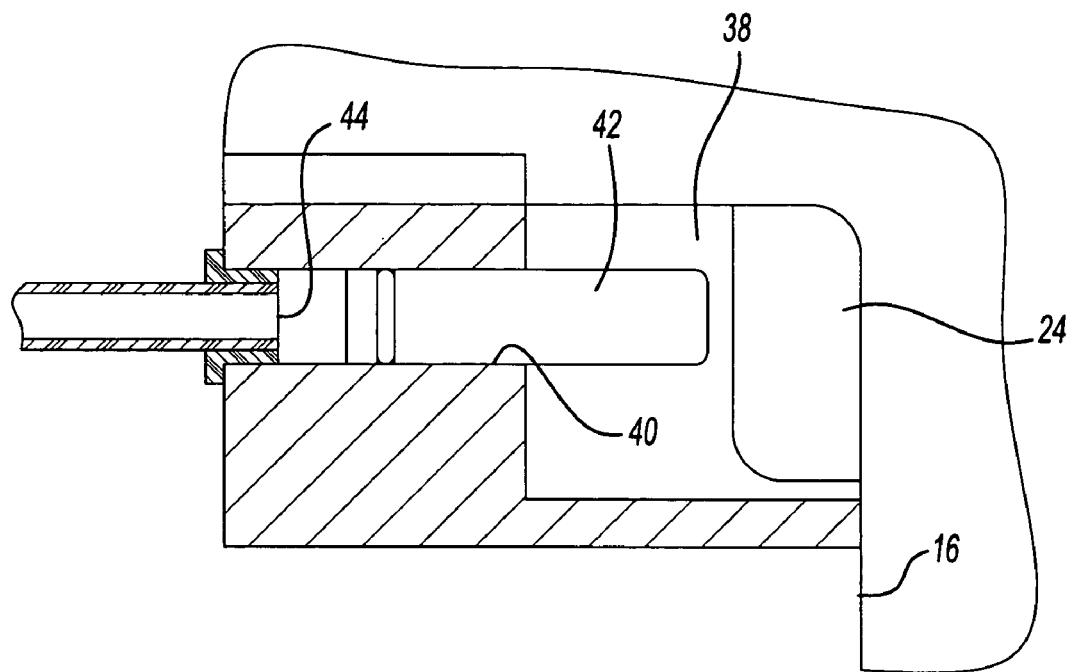
FIG. 5A is a partial cross-sectional view of the pneumatic motor trigger actuator in a unengaged condition.
Figure 5B:
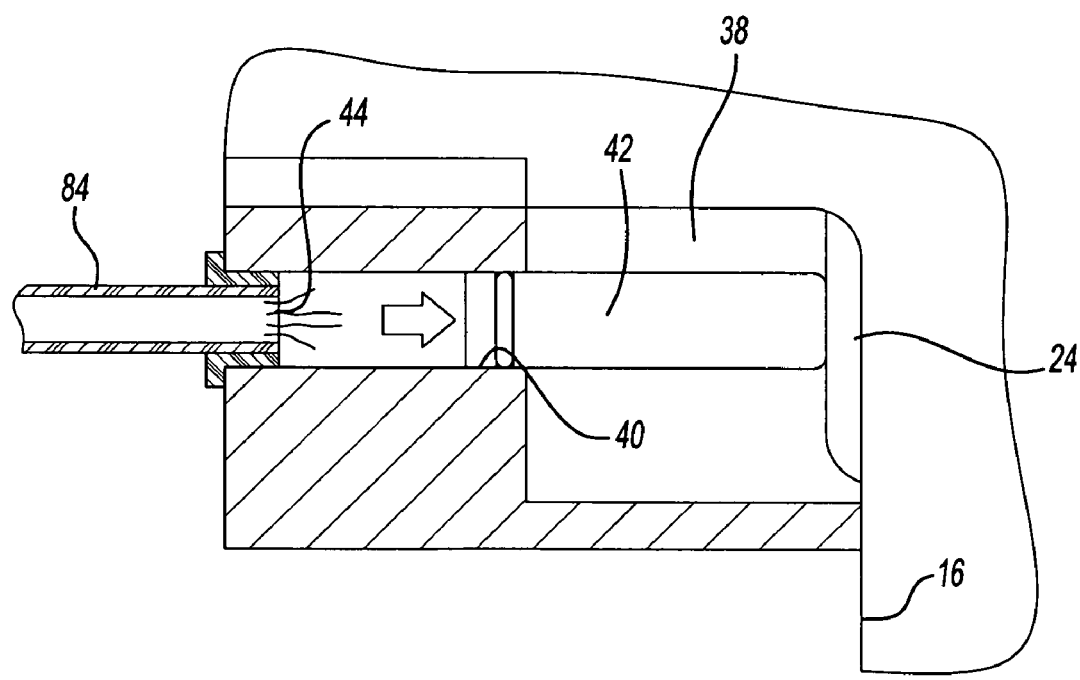
FIG. 5B is a partial cross-sectional view of the pneumatic motor trigger actuator in an engaged condition.

As can be seen in FIG. 5A, the normal bias of the motor trigger 24 urges the piston 42 into the aperture 40 and accordingly keeps the pneumatic drill 12 in an "off" condition. However, as can be seen in FIG. 5B, as the compressed air from the third conduit 84 urges the cylindrical piston 42 out of the aperture 40 it engages the motor trigger 24 of the pneumatic drill 12. This in turn starts the pneumatic drill 12. A continuous source of compressed air will in turn maintain the motor of the pneumatic drill 12 in an "on" condition until such time as either the adjustable feed depth control 64 moves the primary air valve 58 to its closed position or an operator engages the emergency stop button 70 to urge the emergency stop air valve 60 to its closed position (or alternatively its open position according to the alternate preferred embodiment). At that time the compressed air flow to the trigger housing 26 will cease and the trigger 24 will move to its unengaged position as shown in FIG. 5A, thereby interrupting the flow of compressed air to the motor and thus turning off the pneumatic drill 12.

Figure 6A:
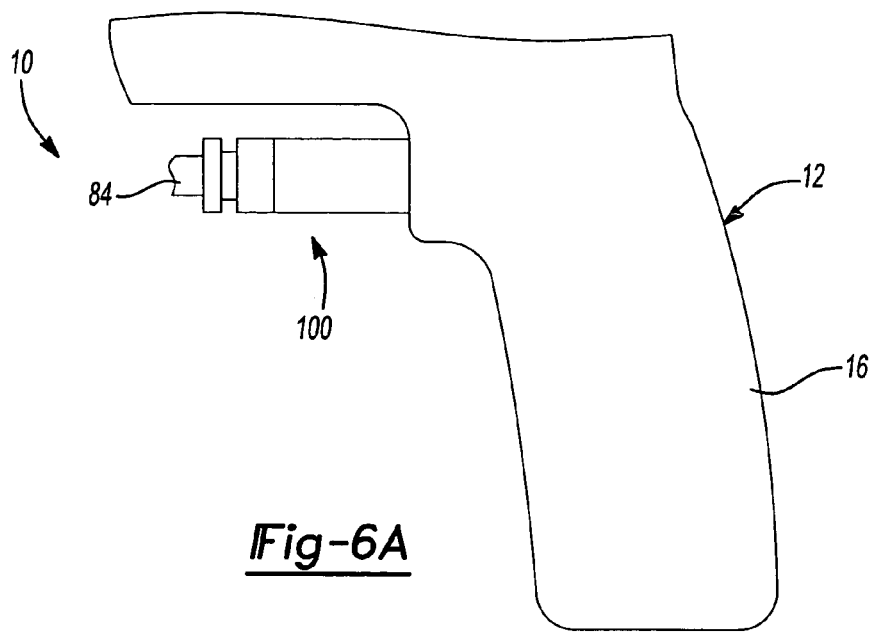
FIG. 6A is a side view of an alternate pneumatic motor trigger actuator having a modified motor trigger shown in operative associated with an exemplary pneumatic tool.
Figure 6B:
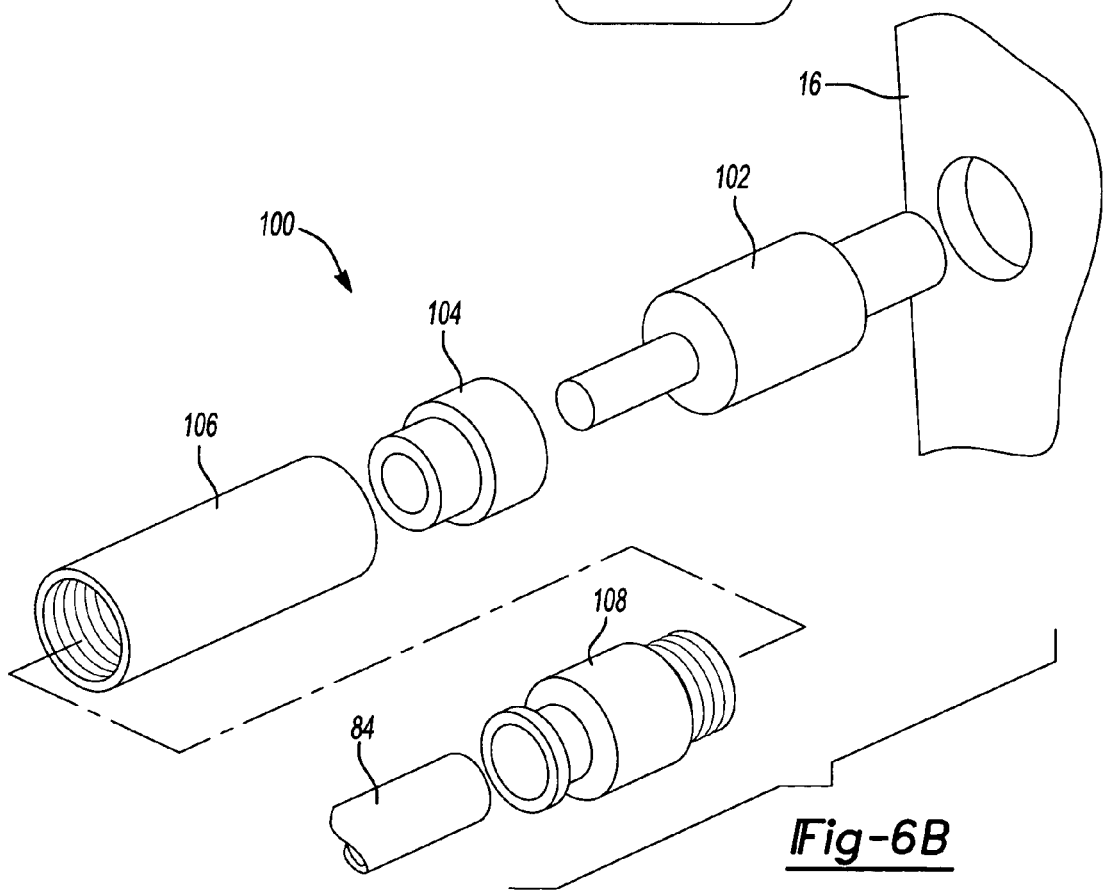
FIG. 6B is an isometric disassembled view of the modified motor trigger shown in FIG. 6A.

With reference to FIGS. 6A and 6B, an alternative preferred motor trigger assembly 100 is shown in operative association with the trigger actuator 10 and exemplary drill 12. The modified motor trigger assembly 100 replaces the trigger housing 26 (FIGS. 1 through 5) and the motor trigger 24 (FIG. 1) of the pneumatic drill 12. The modified motor trigger assembly 100 includes a motor trigger 102 inserted into a trigger retainer 104. The trigger retainer 104 has a shape that is adapted to fit within a conventional pilot actuator 106, such as, for example, a Clippard pilot actuator. A standard fitting 108 couples the third tube 84 with the pilot actuator 106. Operation of the trigger actuator 10 with the motor trigger assembly 100 is substantially similar to that of the trigger housing 26 and motor trigger 24 in FIGS. 1 through 5 in that compressed air flow through the valve assembly 30 urges the pilot actuator 106 to engage the modified motor trigger 102 in order to engage the pneumatic motor (not shown).

By eliminating the need for an operator to continuously hold down the motor trigger 24 throughout a drilling operation, operator fatigue is greatly reduced. Furthermore, the pneumatic motor trigger actuator 10 may be installed on any pneumatic tool simply by adjusting the contour surfaces of the trigger housing 26 and the top plate 28 (e.g., modifying the top surface 46 and the bottom surface 52). In addition, the motor trigger actuator, in its preferred embodiments described herein, does not unnecessarily complicate the construction of a pneumatic drilling tool or add significantly to its cost of construction.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for controlling on/off actuation of a pneumatic tool comprising:
   providing a compressed fluid to the pneumatic tool;
   diverting the compressed fluid through a valve assembly;
   actuating the valve assembly to a first condition such that the compressed fluid actuates an on/off trigger on the pneumatic tool to turn the pneumatic tool on, including actuating a switch on the valve assembly to activate the valve assembly to the first condition; and
   actuating the valve assembly to a second condition such that the compressed fluid does not actuate the on/off trigger on the pneumatic tool to turn the pneumatic tool off.

2. The method of claim 1, in which the operation of actuating the valve assembly to the second condition includes actuating a switch on the valve assembly.

3. The method of claim 1, further comprising:
   using a stop switch to automatically actuate the valve assembly to the second condition when predefined conditions are met.

4. The method of claim 3, further comprising:
   using a pneumatic drill for the pneumatic tool; and
   establishing a predefined drill depth for the predefined conditions.

* * * * *